(12) United States Patent
Janković

(10) Patent No.: US 12,491,606 B2
(45) Date of Patent: Dec. 9, 2025

(54) CYLINDRICAL TOOL FOR THIN SAMPLE GRINDING AND POLISHING

(71) Applicant: Dragana Janković, Sarajevo (BA)

(72) Inventor: Dragana Janković, Sarajevo (BA)

(73) Assignee: DRAGANA JANKOVIC, Sarajevo (BA)

( * ) Notice: Subject to any disclaimer, the term of this patent is extended or adjusted under 35 U.S.C. 154(b) by 448 days.

(21) Appl. No.: 17/300,787

(22) Filed: Nov. 10, 2021

(65) Prior Publication Data
US 2022/0379437 A1  Dec. 1, 2022

(30) Foreign Application Priority Data
May 26, 2021  (BA) ............................... BAP213414A

(51) Int. Cl.
*B24D 5/06* (2006.01)
*B24D 3/34* (2006.01)

(52) U.S. Cl.
CPC ............... *B24D 5/06* (2013.01); *B24D 3/34* (2013.01); *B24D 2205/00* (2013.01)

(58) Field of Classification Search
CPC ......... B24B 37/27; B24B 37/30; B24B 39/06; B28D 7/04; G01N 1/04; B23B 31/20125; B24D 3/34; Y10T 29/4998
USPC ........................................................ 451/544
See application file for complete search history.

(56) References Cited

U.S. PATENT DOCUMENTS

| | | | | |
|---|---|---|---|---|
| 11,123,833 | B2 * | 9/2021 | Riha ................... | B23Q 17/2216 |
| 2007/0184755 | A1 * | 8/2007 | Park ........................ | B24B 37/30 |
| | | | | 451/41 |

FOREIGN PATENT DOCUMENTS

| | | | | |
|---|---|---|---|---|
| KR | 20080049166 | A | * | 6/2008 |
| KR | 100919827 | B1 | * | 10/2009 |
| KR | 20110072821 | A | * | 6/2011 |
| KR | 20200046717 | A | * | 5/2020 |

OTHER PUBLICATIONS

KR 20110072821—Machine Translation (Year: 2011).*
KR 20080049166—Machine Translation (Year: 2008).*
KR 20200046717—Machine Translation (Year: 2020).*
KR 100919827—Machine Translation (Year: 2009).*

* cited by examiner

*Primary Examiner* — Brian D Keller
*Assistant Examiner* — Alberto Saenz

(57) ABSTRACT

The design of a stainless-steel cylindrical tool for manual grinding and polishing of cement-based thin sample (two cylinders one withing the other, connected by the movable threaded holder with a plate, that passes through the middle) enables very precise removal of sample layers to its thickness of 1-mm (1/32 inch) and less. The squared, young aged sample rests on the circular plate on a holder, that can be slowly and safely rotated during thin layer removal, to obtain a smooth and flat sample surface, which can produce sharp digital images in ESEM, necessary for detailed and accurate image analysis. The cylindrical tool can be reassembled. It is reusable, easy to maintain and clean. Its design is practical since inner cylinder can be replaced if damaged, with the identically designed inner cylinder or with differently designed inner cylinder adjusted to another sample size.

5 Claims, 3 Drawing Sheets

Figure 1:
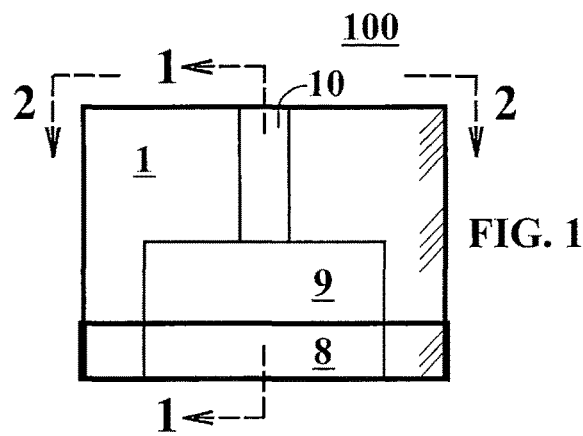

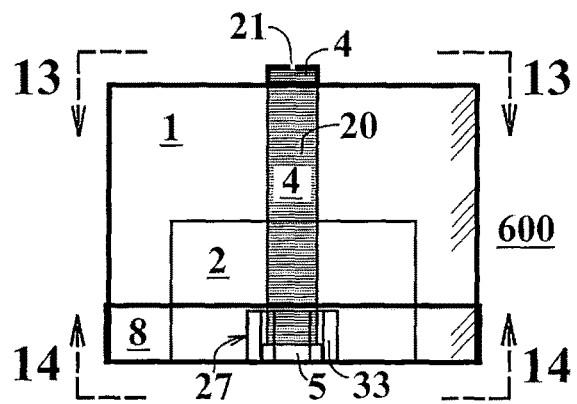
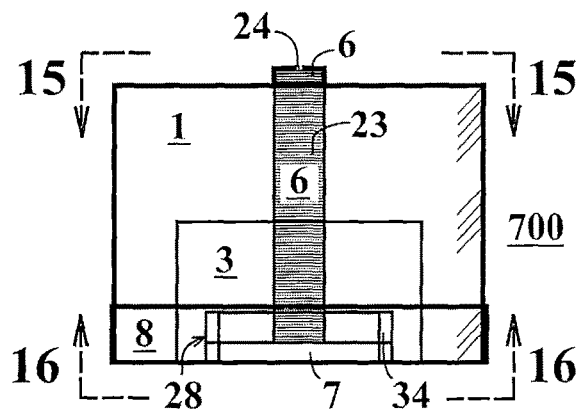
FIG. 18  FIG. 21
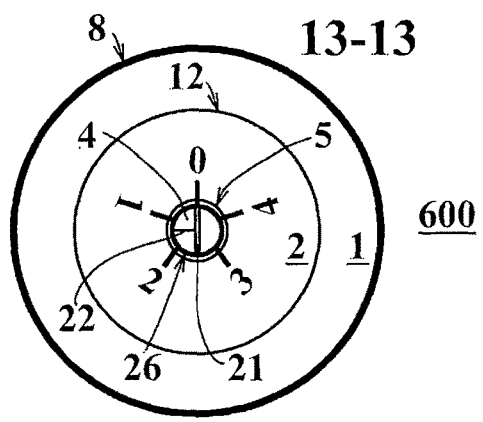
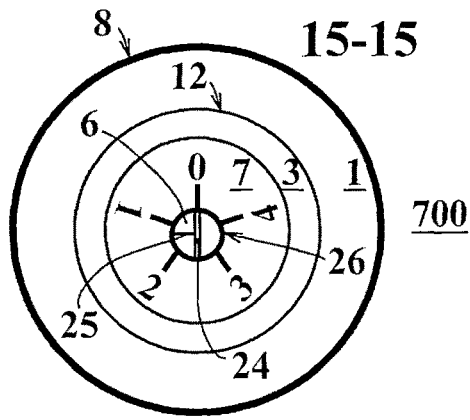
FIG. 19  FIG. 22
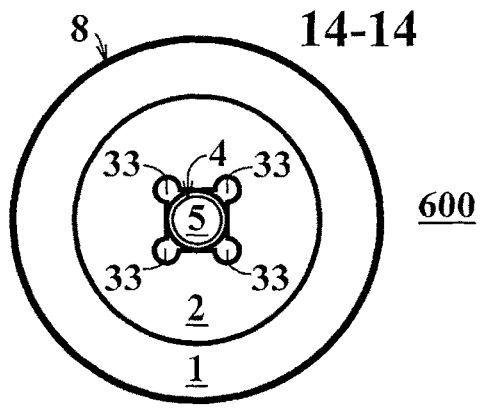
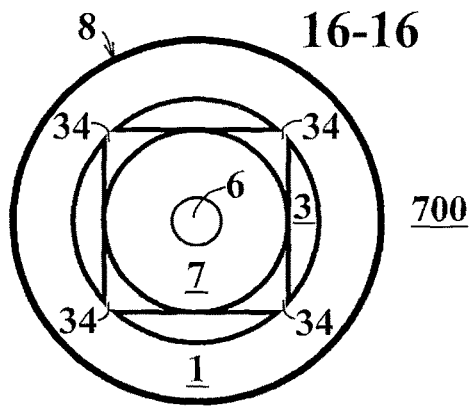
FIG. 20  FIG. 23

CYLINDRICAL TOOL FOR THIN SAMPLE GRINDING AND POLISHING

1. BACKGROUND OF THE INVENTION

I. The challenge of proper preparation of cement-based samples appeared when micro-scale non-destructive experiments on drying shrinkage and microcracking in Environmental Scanning Electron Microscope (ESEM) needed to be performed on 1-mm thick samples at their young age (2-3 days old). The examination of such thin samples, was first suggested in the literature to enable the uniform sample drying. By examining such thin sample, it is possible to avoid the development of a moisture gradient, which would normally appear in the case of larger and thicker cement-based samples. The suggested 1-mm (1/32 inch) sample thickness was applicable in drying shrinkage and microcracking experiments in ESEM, due to the characteristic climate conditions (relative humidity) in ESEM chamber. However, at such young age (2-3 days old), thin samples made of cementitious materials crumble easily during handling.

II. For the preparation of such thin cement-based samples for testing in ESEM, it is very important that sample surface remains undamaged, smooth and freshly polished before the test, in order to obtain a digital image as sharp as possible for further image analysis using Digital Image Analysis. Since these ESEM digital images are generated at micro-scale, at the magnification below 5 m, precision in sample preparation is crucial for accurate experimental results and precise detection of deformation and (possible) appearance of microcracks that may occur due to uneven sample shrinkage. It is therefore necessary, before beginning of ESEM experiments, to prepare (grind and polish) the sample surface to be completely smooth to avoid contrast reduction in digital image. Equally important is to avoid the appearance of (micro)cracks as the result of sample preparation and not as the result of drying experiments.

III. Grinding and polishing of larger and already harden samples by a tool or hand is typically done on a grinding machine, with two rotating wheels, where the special sandpaper of different granulation is attached at each wheel. However, no tool for grinding and polishing of larger samples could be used to prepare such thin and sensitive sample. Some researchers who worked on similar tests in ESEM, would manually polish smaller sample-flakes (age 7 days and above) directly by hand, after obtaining them by breaking larger (typically) prismatic sample with a hammer (Neubauer et al.). Such sample preparation would produce an uneven sample and it would ruin the sample microstructure before the test.

IV. The inventor* of the current cylindrical tool previously invented a mould for casting samples of 2-mm (1/16 inch) thickness. Therefore, it was necessary to invent a way in which such 2-mm (1/16 inch) thick samples could be grind and polished without breaking or damaging them while obtaining the smooth and fresh sample surface. Neither any tools for grinding and polishing of such thin, young cement-based sample nor an established method for the preparation of 1-mm (1/32 inch) thick samples, was known to the current inventor* at the time of cylindrical tool invention.

*Inventor: MSc Dragana Janković, Structural Civil Engineer, UCF, FL

REFERENCE

Neubauer, C. M., Jennings H. M. and Garboczi E. J. *Mapping drying shrinkage deformations in cement-based materials, Cement and Concrete Research*, Vol. 27, no. 10 (1997), pp. 1603-1612.

2. BRIEF SUMMARY OF INVENTION

In order to manually prepare thin sample of cementitions materials for the observation of drying shrinkage and microcracking in the electron microscope (ESEM), a cylindrical stainless-steel tool is constructed. The three-part tool consists of outer and smaller inner cylinder and handle with a plate. The tool enables grinding and polishing of a thin sample, 2 mm (1/16 inch) thick, to the desired thickness of 1-mm (1/32 inch) and below thanks to: (a) rotational circular plate with a threaded handle, placed through the center of both cylinders, on which sample is placed, (b) safe sample holding in the specially designed opening in the inner cylinder, (c) circular scale, engraved at the top of outer cylinder, at the opposite end of the sample location, (d) notch and marker on the plate handle, that are used to rotate plate with a screwdriver and to mark the numbers on the circular scale, respectively, to check the sample thickness in the process of grinding and polishing. Based on such sample surface preparation prior to testing, the obtained digital images during drying tests in ESEM are extremely sharp. The cylindrical tool is constructed to be disassembled and reassembled except for the plate and handle, which are made as a whole. The cylindrical tool is multipurpose, easy to handle and maintain, with the possibilty of replacement of the inner cylinder and plate with a handle. Namely, two inner cylinders for grinding and polishing of a sample of different size, are designed to fit in one outer larger cylinder, one at the time. The two inner cylinders differ in the size of inner opening and two plates differ in the size of the diameter. They are adjusted for samples with different dimensions: 10×10×2 mm (3/8×3/8×1/16 inch) or 30×30×2 mm (9/8×9/8×1/16 inch).

3. BRIEF DESCRIPTION OF DRAWINGS

Disassembled Stainless Steel Cylindrical Tool for Small Sample Preparation

FIG. 1. A side view of an empty stainless steel outer cylinder, with a visible not-fully-polished ring layer and indicated-(marked) inner opening for a holder and stainless steel inner (smaller) cylinder, as well as a vertical cross section (1-1) and upper view (2-2) of the stainless steel outer cylinder.

Figure 2:
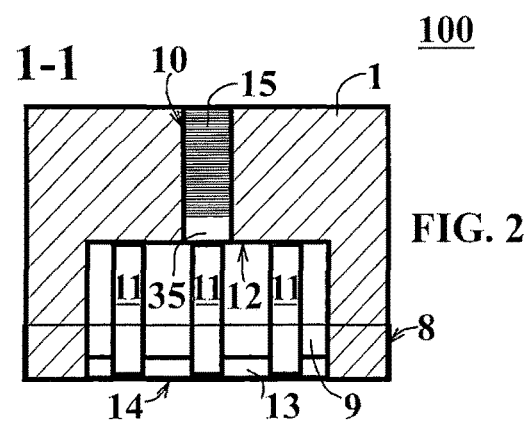

FIG. 2. The vertical cross section (1-1) of the empty stainless steel outer cylinder, with the visible threaded opening for the holder and lined thin metal sheets around the opening for the stainless steel inner cylinder placement.

Figure 3:
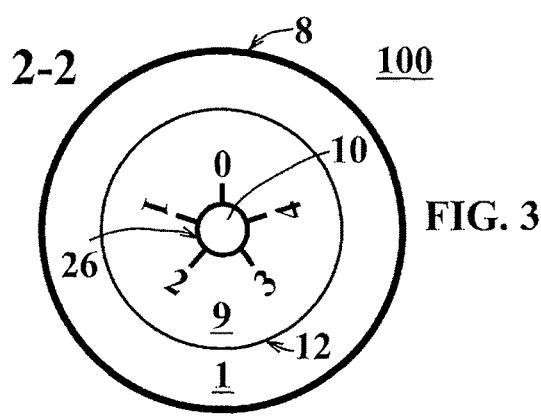

FIG. 3. The upper view (2-2) of the empty stainless steel outer cylinder with the visible opening for the holder around which the scale (0-4) is engraved and marked opening for the stainless steel inner cylinder.

Figure 4:
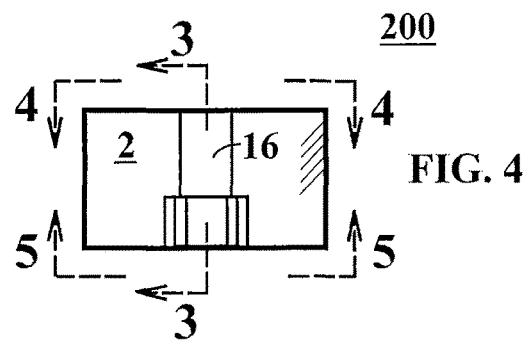

FIG. 4. A side view of an empty stainless steel inner cylinder with a marked opening for the holder and a small plate for 10×10×2 mm (3/8×3/8×1/16 inch) sample holding as well as a cylinder vertical cross section (3-3), upper view (4-4) and bottom view (5-5).

Figure 5:
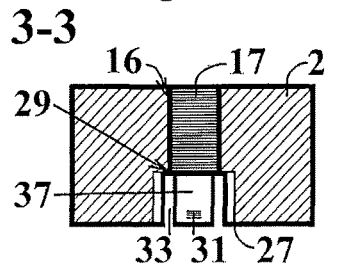

FIG. 5. The vertical cross section (3-3) of the empty stainless steel inner cylinder so that the threaded opening for the holder and inner opening with surrounding wall (edge), for the plate and sample (10×10×2 mm or ⅜×⅜×1/16 inch), is visible.

Figure 6:
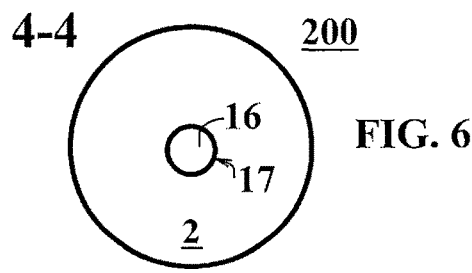

FIG. 6. The upper view (4-4) of the stainless steel inner cylinder with the visible rounded holder opening.

Figure 7:
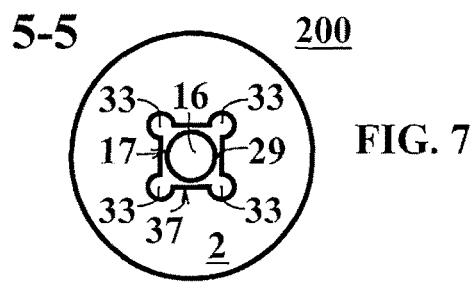

FIG. 7. The bottom view (5-5) of the stainless steel inner cylinder with the visible circular hole for the holder from the bottom part and the opening with surrounding walls (edges), where the plate and sample (10×10×2 mm or ⅜×⅜×1/16 inch) are placed.

Figure 8:
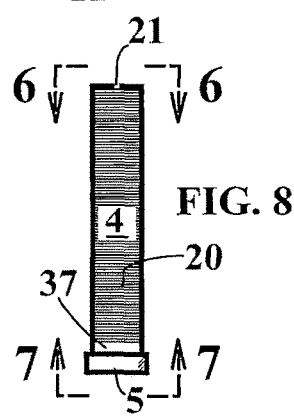

FIG. 8. A side view of a stainless steel threaded holder with a plate for 10×10×2 mm (⅜×⅜×1/16 inch) sample holding.

Figure 9:

FIG. 9. The upper view (6-6) of a rounded-holder end, where a notch and marker are engraved.

Figure 10:

FIG. 10. The bottom view (7-7) of the circular stainless steel plate at another holder end for 10×10×2 mm (⅜×⅜×1/16 inch) sample holding.

Disassembled Stainless Steel Cylindrical Tool for Large Sample Preparation

Figure 24:
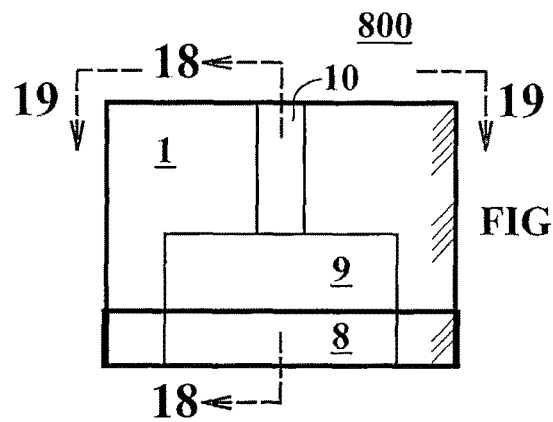

FIG. 24. A side view of an empty stainless steel outer cylinder, with a visible not-fully-polished ring layer and indicated (marked) inner opening for holder and stainless steel inner (smaller) cylinder, as well as vertical cross section (18-18) and upper view (19-19) of the stainless steel outer cylinder.

Figure 25:
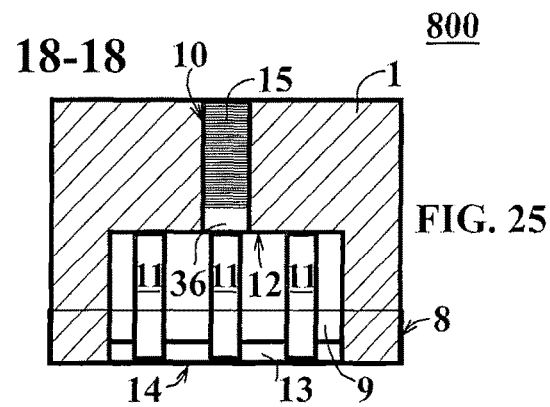

FIG. 25. The vertical cross section (18-18) of the empty stainless steel outer cylinder, with a visible threaded opening for the holder and lined thin metal sheets around the opening for the stainless steel inner cylinder placement.

Figure 26:
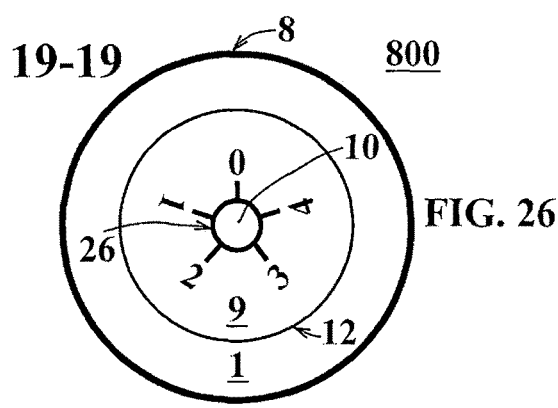

FIG. 26. The upper view (19-19) of the empty stainless steel outer cylinder with the visible opening for the stainless steel holder around which the scale (0-4) is engraved and marked opening for stainless steel inner cylinder.

Figure 11:
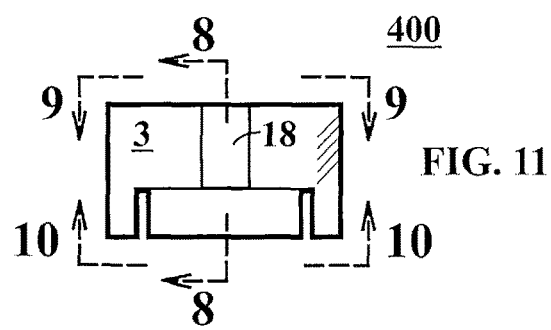

FIG. 11. A side view of an empty stainless steel inner cylinder with a marked opening for the stainless steel holder and larger plate for 30×30×2 mm (9/8×9/8×1/16 inch) sample holding as well as vertical cross section (8-8), upper view (9-9) and bottom view (10-10).

Figure 12:
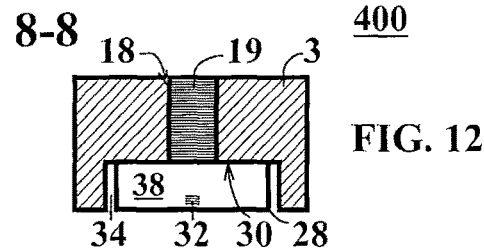

FIG. 12. The vertical cross section (8-8) of the empty stainless steel inner cylinder so that threaded opening for the stainless steel holder and inner opening for plate and 30×30×2 mm (9/8×9/8×1/16 inch) sample holding is visible.

Figure 13:
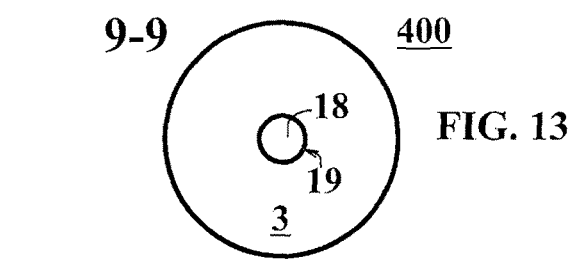

FIG. 13. The upper view (9-9) of the stainless steel inner cylinder with the visible rounded holder opening.

Figure 14:
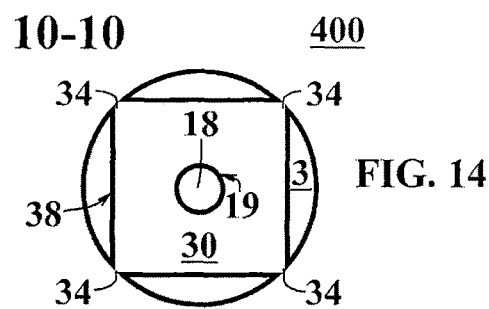

FIG. 14. The bottom view (10-10) of the stainless steel inner cylinder with visible circular hole for the stainless steel holder and opening with surrounding half-circled walls (edges) for placing plate and (30×30×2 mm or 9/8×9/8×1/16 inch).

Figure 15:
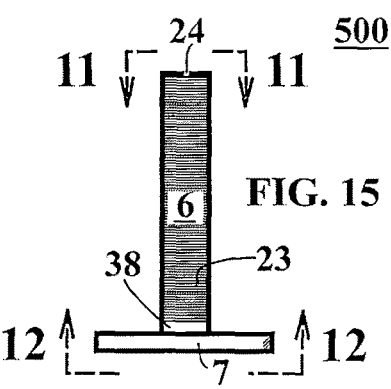

FIG. 15. A side view of a threaded stainless steel holder with a plate for 30×30×2 mm (9/8×9/8×1/16 inch) sample holding.

Figure 16:
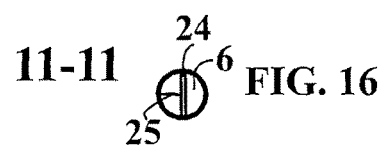

FIG. 16. The upper view (11-11) of a rounded holder end, where the notch and marker are engraved.

Figure 17:
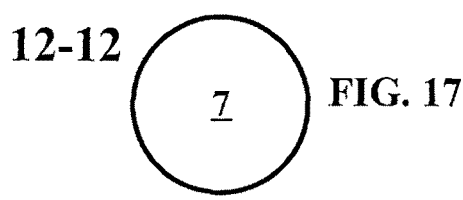

FIG. 17. The bottom view (12-12) of the circular stainless steel plate at the holder end for 30×30×2 mm (9/8×9/8×1/16 inch) sample holding.

Assembled Stainless Steel Cylindrical Tool

FIG. 18. A side view of an assembled stainless steel cylindrical tool with marked threaded holder with a plate and stainless steel inner cylinder for 10×10×2 mm (⅜×⅜×1/16 inch) sample and visible not-fully-polished ring layer around the lower part of stainless steel outer cylinder; an upper and bottom view of the assembled stainless steel cylinder are marked.

FIG. 19. The upper view (13-13) of the assembled stainless steel cylindrical tool with: visible engraved circular scale with numbers (0-4), holder end with engraved notch and marker, and marked stainless steel inner cylinder and a circular plate for 10×10×2 mm (⅜×⅜×1/16 inch) sample holding.

FIG. 20. The bottom view (14-14) of the assembled stainless steel cylindrical tool, where stainless steel inner cylinder with the bottom opening and circular plate for 10×10×2 mm (⅜×⅜×1/16 inch) sample holding are visible, while a rounded holder end is marked.

FIG. 21. A side view of an assembled stainless steel cylindrical tool with marked threaded holder with a plate and stainless steel inner cylinder for 30×30×2 mm (9/8×9/8×1/16 inch) sample and visible not-fully-polished ring layer around the lower part of the stainless steel outer cylinder.

FIG. 22. The upper view (15-15) of the assembled stainless steel cylindrical tool with visible engraved circular scale with numbers (0-4), a holder end with engraved notch and marker, and marked stainless steel inner cylinder and circular plate for 30×30×2 mm (9/8×9/8×1/16 inch) sample holding.

FIG. 23. The bottom view (16-16) of the assembled stainless steel cylindrical tool, where stainless steel inner cylinder with the bottom opening and circular plate for 30×30×2 mm (9/8×9/8×1/16 inch) sample holding are visible, while the rounded holder end is marked.

4. DETAILED DESCRIPTION OF INVENTION

I. A stainless steel cylindrical tool is designed to hold an early aged (2-3 days old and above) thin cement-based sample 2 mm (1/16 inch) thick during manual grinding and polishing to 1-mm (1/32 inch) thickness or below, without damaging or breaking it. The invention of the stainless steel cylindrical tool followed an invention of a stainless steel mould for thin cement-based sample casting from the same inventor*.

II. An assembled stainless steel cylindrical tool 600 (700) for the thin cement-based sample size 10×10×2 mm or ⅜×⅜×1/16 inch (30×30×2 mm or 9/8×9/8×1/16 inch), FIGS. 18, 21, consists of three main stainless steel parts: an outer (larger) cylinder 100 (800), FIGS. 1-3, 24-26, a more than one stainless steel inner (smaller) cylinder 200 (400), FIGS. 4-7, 11-14, and a more than one stainless steel threaded holder 4 (6) with a circular plate 5 (7) respectively, FIGS. 8-10, 15-17 and 18-23. The stainless steel outer and the more than one stainless steel inner cylinder can be disassembled and reassembled again except for the more than one stainless steel threaded holder 4 (6) with the circular plate 5 (7) as they form a whole, FIGS. 8-10, 15-17. The characteristic of disassembling and reassembling gives the possibility of a replacement of the more than one stainless steel inner cylinder: the stainless steel inner cylinder 200 (for the thin cement-based sample size 10×10×2 mm or ⅜×⅜×1/16 inch), FIGS. 4-7 can be replaced with the stainless steel inner cylinder 400 (for the larger thin cement-based sample 30×30×2 mm or 9/8×9/8×1/16 inch), FIGS. 11-14, together with the associated stainless steel threaded holder 4 (6) and the circular plate 5 (7), FIGS. 8-10, 15-17. The disassembling also enables a thorough cleaning of the stainless steel cylindrical tool after the thin cement-based sample preparation.

III. A total height of the stainless steel cylindrical tool 600 (700), FIGS. 18, 21 is determined by the total height of the stainless steel outer cylinder 100 (800), FIGS. 1-2, 24-25, which is 45 mm (9³⁄₁₆ inch). For easier handling of the heavy stainless steel cylindrical tool during grinding and polishing, a ring layer 8 (FIGS. 1-3, 18-23, 24-25) surrounding a bottom portion of the stainless steel outer cylinder 100 (800) is not completely polished during a final mechanical steel processing as the rest of an exterior of the stainless steel outer cylinder. Hence, it appears as an additional layer in comparison to the rest of the stainless steel outer cylinder height. As a consequence, a size of an outer diameter at the bottom of the stainless steel outer cylinder wall 1, FIGS. 3, 19, 22, 26 is kept as φ60 (9 2/8 inch) at the bottom and up to 11 mm (³⁄₈ inch) height, and then reduced to φ58 (3 6/8 inch) at the remaining height of 34 mm (11/8 inch), FIGS. 1-2, 18, 21, 24-25, 21.

IV. The more than one stainless steel inner cylinder 200 (400), FIGS. 4-7 (11-14), are 22.5 mm (9³⁄₃₂ inch) high, with a diameter φ39.5 (3/2 inch), and have a threaded vertical opening 16 (18) of the same diameter extending from an upper portion to a ⅔ of height of the more than one stainless steel inner cylinders. However, the more than one stainless steel inner cylinder differ in a design and a size of a square shaped inner opening 27 (28), 29 (30), 33 (34), extending below the threaded vertical opening, at lower ⅓ of the height FIGS. 5, 7, 12, 14, 20, 23. The square shaped inner opening is created as a free space sufficiently deep for a vertical rotational movement of the stainless steel threaded holder 4 (6) with the circular plate 5 (7), FIGS. 8-10, 15-17.

V. A placement of the stainless steel inner cylinder 200 (400), FIGS. 4-7 (11-14) into the stainless steel outer cylinder 100 or 800 respectively (FIGS. 1-3, 24-26) is done by making a circular inner opening 9, φ40.5 (3/2 inch) and 22.5 mm (9³⁄₃₂ inch) high extending below the threaded vertical opening to the bottom portion of the stainless steel outer cylinder 100 and 800 (FIGS. 2 and 25). Easier pulling out of the stainless steel inner cylinder and a prevention of any friction that might occur between the stainless steel outer 100 (800) and the stainless steel inner cylinder 200 (400) respectively during the stainless steel cylindrical tool disassembling or reassembling, is done by an inclusion of rounded slots 12-14 configured to receive rectangular metal sheets 11 in the circular inner opening 9 of the stainless steel outer cylinder 100 (800), FIGS. 2-3, 25-26. The rectangular metal sheets 11 are 5 mm (³⁄₁₆ inch) wide and 22.5 mm (9³⁄₃₂ inch) high.

VI. The more than one stainless steel threaded holder φ8 (⁵⁄₁₆ inch), 4 (6), FIGS. 8, 15, 18, 21, are 45 mm (9³⁄₁₆ inch) long, merged with the circular plate 5, φ10 (⅜ inch) in FIGS. 8, 10, 18 or the circular plate 7, φ30 (⅞ inch) in FIGS. 15, 17, 21. The more than one stainless steel threaded plate holder 4 (6) are horizontally threaded at each 0.25 mm (³⁄₃₂₀ inch) in FIGS. 8, 15, from an upper portion of the stainless steel holder till 2 mm (¹⁄₁₆ inch) 37 (38) above the circular plate 5 (7) in FIGS. 8, 15 due to a final mechanical steel processing. Same sized threads 15 are also engraved in a vertical circular opening 10 extending through a middle upper portion of the stainless steel outer cylinder 100 (800) height 17.5 mm or ⅝ inch from 1 to 35 (36), FIGS. 2, 25, due to a final mechanical processing and in the more than one stainless steel inner cylinder 200 (400) opening 16 (18) height 14.5 mm or ½ inch, FIGS. 4-5, 11-12. The threads enable assembling of the stainless steel outer and the more than one stainless steel inner cylinder (one at a time) with the more than one stainless steel threaded holder (one at a time) and the circular plate. The more than one stainless steel threaded holder 4 (6) and the circular plate 5 (7), FIGS. 8, 15 can be rotated with a help of a notch 21 (24) that is 1 mm (¹⁄₃₂ inch) wide and 8 mm long (⁵⁄₁₆ inch), FIGS. 8-9, 15-16, and a screwdriver.

VII. The circular plate 5 (7), FIGS. 8, 10, 15, 17, 18, 20, 21, 23 serves as a thin cement-based sample carrier. In order to easily rotate the more than one stainless steel threaded holder 4 (6) together with the circular plate 5 (7) up and down, through the threaded vertical openings 10 and 16 (18) in the stainless steel outer and the more than one stainless steel inner cylinder part 1 and 2 (3), FIGS. 1, 4, 11, 24, the plate must be circular, not squared, although the thin cement-based samples are squared. The cylindrical shape of the stainless steel tool is also more practical for handling during grinding and polishing, in comparison to any other shape. In order to control a thickness of a thin cement-based sample-layer during the sample-layer removal, a rounded scale 26 with numbers (0-4) is engraved on an upper portion of the stainless steel outer cylinder 100 (800), as in FIGS. 3, 19, 22, 26, where the stainless steel threaded holder 4 (6) of the circular plate 5 (7) sticks out for 3 mm (⅛ inch), FIGS. 18, 21.

VIII. A smaller marker 22 (25), 4 mm (⅛ inch) long engraved vertically to the notch 21 (24), FIGS. 9, 16, 19, 22, is used to mark one of the numbers (0-4) on the engraved rounded scale 26, during the more than one stainless steel threaded holder 4 (6) and circular plate 5 (7) rotation. A depth of the square shaped inner opening 27 (28), below the threaded vertical opening 17 (19) of the more than one stainless steel inner cylinder is 8 mm (⁵⁄₁₆ inch), FIGS. 5, 12, 18, 21. Size of a diameter of the circular plate (φ10 or ⅜ inch), FIG. 10 or φ30 (⅞ inch), FIG. 17 'dictates' a width of the square shaped inner opening 29 (30) in the more than one stainless steel inner cylinder 200 (400), FIGS. 7, 14, 20, 23.

IX. Five horizontal short marks 31 (32) are engraved on the inner walls (edges) around the square shaped inner opening in the more than one stainless steel inner cylinder part 2 (3), FIGS. 5, 12. The engraved short marks are 5 mm (³⁄₁₆ inch) long. They are used to help measuring (double check) the thin cement-based sample thickness during the sample-layer removal. Four small rounded corner openings 33 (φ4 or ⁵⁄₃₂ inch), of a space 29 at the bottom of the more than one stainless steel inner cylinder 200 for 10×10×2 mm (⅜×⅜×¹⁄₁₆ inch) thin cement-based sample, FIGS. 5, 7, 18, 20 are made for a safety of thin cement-based sample corners, in order to prevent the thin cement-based sample corners from breaking, during grinding and polishing. The four larger corner openings 34 of a space 30 for the larger thin cement-based sample (30× 30×2 mm or 9/8×9/8×¹⁄₁₆ inch), FIGS. 12, 14, 21, 23 are made for the same reason.

X. Due to the initial requirements for the thin cement-based sample size in the experiments in ESEM, the stainless steel cylindrical tool was first developed for the larger sized thin cement-based sample 30×30×2 mm or 9/8×9/8×1/16 inch, and then for the smaller sized thin cement-based sample 10×10×2 mm (3/8×3/8×1/16 inch). The stainless steel cylindrical tool was developed in a few steps almost like a trial-and-error method: by designing the more than one stainless steel inner cylinder 200 (400), FIGS. 4, 11, for the small and large thin cement-based sample, by adding the possibility of disassembling of the stainless steel outer cylinder 100 (800), FIGS. 1, 24, and the more than one stainless steel inner cylinder 200 (400), FIGS. 4, 11, by reducing the thickness of threads 15, 17, 20, 19, 23 (FIGS. 2, 5, 8, 12, 15), by enabling the four rounded or open corners 33 (34) for the thin cement-based sample corners at the bottom of the more than one stainless steel inner cylinder, FIGS. 7, 14, 20, 23, by engraving the additional rounded scale 26 on the upper portion of the stainless steel outer cylinder 100 (800), FIGS. 3, 19, 22, 26, the notch 21 (24) and the marker 22 (25) at one of the stainless steel threaded holder ends (FIGS. 9, 16, 19, 22).

XI. The grinding and polishing procedure is as follows. The stainless steel cylindrical tool is assembled such that the more than one stainless steel inner cylinder are placed one at a time in the stainless steel outer cylinder and fasten with the more than one stainless steel threaded holder (with the circular plate), one at a time. In an assembled stainless steel cylindrical tool, the circular plate on the more than one stainless steel threaded holder is first elevated to the same level with a bottom surface of the more than one stainless steel inner and stainless steel outer cylinder (FIGS. 20, 23), with a help of the notch, screwdriver and the engraved rounded scale, so that the thin cement-based sample can be placed on a circular plate surface. To prevent the thin cement-based sample from falling off the circular plate, a visible layer of a paste can be applied to the circular plate surface for a thin cement-based sample attachment, if the thin dry (dry-cured) cement-based sample is tested. If the thin cement-based sample is wet (wet-cured in water), then it is not necessary to use any paste since a thin water layer holds the thin cement-based sample 'fixed' to the circular plate surface.

XII. The circular plate with the thin cement-based sample is then elevated such that a first layer of approximately 0.25 mm (1/128 inch), sticks above the bottom of the assembled stainless steel cylindrical tool surface (thickness controlled via engraved rounded scale and engraved inner short marks). The first thin cement-based sample-layer is removed by grinding on a grinding and polishing machine, with two wheels with SiC (Silicon Carbide) sandpapers of different granulations. For the initial grinding for the thin cement-based sample-layer removal of the first 0.25 mm (1/128 inch) the SiC sandpaper grit 320 is used. Then the grinding is switched to the SiC sandpaper grit 500. When the grinding is completed and the 1-2 layers of 0.25 mm (1/128 inch) are removed, the thin cement-based sample is taken out from the elevated circular plate for thickness measurements. If the newly measured thin cement-based sample thickness is 1.5 mm (1/16 inch), the thin cement-based sample is returned to the circular plate and the polishing is performed until the thin cement-based sample thickness reaches 1 mm (1/32 inch). The polishing is done on SiC sandpaper grit 1200. After the polishing of new 1-2 layers, the thin cement-based sample is again taken for the thickness measurements. If necessary, the grinding and polishing can be done even to the thickness of 0.5 mm (1/64 inch) of the thin cement-based sample.

XIII. Both grinding and polishing is done by hand, in a few steps, carefully and very precisely holding the stainless steel cylindrical tool vertically, perpendicular to the grinding/polishing machine to avoid damaging of the thin cement-based sample and to obtain the equally thick cement-based sample at all sides. The duration of grinding and polishing depends on the thin cement-based sample age, way of curing (wet or dry) and a cement-based composition (concrete/mortar/cement paste). If the thin cement-based sample is 2-3 days old, it can be grind and polished to 1 mm (1/32 inch) in 10-12 min. If the thin cement-based sample is older (7 days and beyond), the grinding and polishing procedure can take up to 20 min.

XIV. Due to the design of the square-shaped inner opening of the more than one stainless steel inner cylinder (8 mm or 5/16 inch high), it is possible to place cement-based samples up to 5 mm thickness. The inventor* believes that such stainless steel cylindrical tool could be used for grinding and polishing of samples made of other materials as long as they do not damage the stainless steel cylindrical tool.

*MSc. Dragana Janković, Structural Civil Engineer, UCF, FL

The invention claimed is:

1. A stainless steel cylindrical tool for grinding and polishing thin cement-based samples to 1-mm (1/32 inch) thickness and below, comprising:
   a stainless steel outer cylinder with an engraved rounded scale on an upper portion of the stainless steel outer cylinder,
   a threaded vertical opening extending through a middle upper portion of the stainless steel outer cylinder,
   a circular inner opening extending below the threaded vertical opening to a bottom portion of the stainless steel outer cylinder, wherein the circular inner opening includes rounded slots configured to receive rectangular metal sheets,
   a ring layer surrounding the bottom portion of the stainless steel outer cylinder,
   a more than one stainless steel inner cylinder, which fit in the circular inner opening of the stainless steel outer cylinder, one at a time,
   a square shaped inner opening extending at a lower portion until a bottom of the more than one stainless steel inner cylinder, which is surrounded by four inner walls with engraved horizontal short marks on each of the four inner walls, with four open rounded corners between each of the four inner walls,
   a threaded vertical opening extending in an upper portion of the more than one stainless steel inner cylinder,
   a more than one stainless steel threaded holder, which extends from a bottom of the stainless steel outer and the more than one stainless steel inner cylinder and over the upper portion of the stainless steel outer cylinder, with an extension in a form of a circular plate at one end, and a notch with a marker at another end.

2. The stainless steel cylindrical tool of claim 1, wherein the square shaped inner opening in the more than one stainless steel inner cylinder of any size depth, accommodates a portion of the circular plate of different size on the more than one stainless steel threaded holder, together with the thin cement-based sample, such that corners of the thin cement-based sample that rest on the circular plate, fit in the four open rounded corners of the square shaped inner opening in the more than one stainless steel inner cylinder.

3. The stainless steel cylindrical tool of claim 1, wherein disassembled parts of the stainless steel cylindrical tool comprising the stainless steel outer and the more than one stainless steel inner cylinder and the more than one stainless steel threaded holder with the circular plate are manually assembled as a whole, wherein one of the more than one stainless steel inner cylinder is placed in the stainless steel outer cylinder and fasten with the more than one stainless steel threaded holder through the threaded vertical opening in the stainless steel outer and the more than one stainless steel inner cylinder, wherein threads of the threaded vertical opening in the stainless steel outer and the more than one stainless steel inner cylinder are of the same size as threads of the more than one stainless steel threaded holder with the circular plate.

4. The stainless steel cylindrical tool of claim 1, wherein the more than one stainless steel threaded holder with the circular plate is moved up and down from an end of the engraved rounded scale, through the threaded vertical opening in the stainless steel outer and the more than one stainless steel inner cylinder by a vertical rotation, with a help of the notch, marker and a screwdriver.

5. A method for grinding and polishing of thin cement-based samples, comprising:
   in an assembled stainless steel cylindrical tool, a circular plate on a more than one stainless steel threaded holder is first elevated to a same bottom surface level of a stainless steel outer and more than one stainless steel inner cylinder with a help of a notch, marker, screwdriver and an engraved rounded scale;
   the thin cement-based sample is placed on a surface of the circular-plate, wherein the thin cement-based sample is attached on the surface of the circular plate with a visible layer of a paste, if dry cured;
   the circular plate with the attached thin cement-based sample is then adjusted such that any portion of the first thin cement-based sample-layer sticks above the bottom surface of the assembled stainless steel cylindrical tool, wherein the thin cement-based sample thickness is controlled via the engraved rounded scale;
   the first thin cement-based sample-layer of 0.25 mm ($1/128$ inch) is removed by grinding on a grinding and polishing machine, with SiC (Silicon carbide) sandpaper grit 320, then the grinding is switched to SiC sandpaper grit 500, so 1-2 layers of 0.25 mm ($1/128$ inch) are removed;
   the thin cement-based sample is taken out from the elevated circular plate for thickness measurements;
   if the measured thin cement-based sample thickness is 1.5 mm ($1/16$ inch), the thin cement-based sample is returned to the circular plate and a polishing with SiC sandpaper grit 1200 is performed to remove new 1-2 layers until the thin cement-based sample thickness reaches 1 mm ($1/32$ inch);
   a removal of layers is done by hand, vertically holding the stainless steel cylindrical tool perpendicular to the grinding/polishing machine and the SiC sandpaper, to obtain the equally thick cement-based sample at all sides;
   after the removal of the new 1-2 layers of 0.25 mm ($1/128$ inch), the thin cement-based sample thickness is additionally controlled;
   a duration of grinding and polishing procedure depends on the thin cement-based sample age.

* * * * *